United States Patent [19]

Hammon et al.

[11] Patent Number: 4,868,017
[45] Date of Patent: Sep. 19, 1989

[54] STRUCTURE-FREE APPLICATION OF DISPERSIONS TO FLEXIBLE BASE MATERIALS

[75] Inventors: Fritz Hammon, Frankenthal; Uwe Heim, Bechhofen; Eduard Kaemmer, Dannstadt-Schauernheim; Hans-Peter Reuther, Ludwigshafen, all of Fed. Rep. of Germany

[73] Assignee: BASF Aktiengesellschaft, Ludwigshafen, Fed. Rep. of Germany

[21] Appl. No.: 199,864

[22] Filed: May 27, 1988

[30] Foreign Application Priority Data

May 27, 1987 [DE] Fed. Rep. of Germany ....... 3717882

[51] Int. Cl.⁴ .......................... B05C 1/06; B05D 3/12
[52] U.S. Cl. .................................. 427/356; 118/200; 118/256
[58] Field of Search ............... 118/200, 256; 427/356, 427/48, 358, 131, 402

[56] References Cited

U.S. PATENT DOCUMENTS 2,975,754 3/1961 Wright .................. 118/407
4,283,443 8/1981 Choinski .................. 427/402 X Primary Examiner—Michael Lusignan
Attorney, Agent, or Firm—Keil & Weinkauf

[57] ABSTRACT

Dispersions consisting essentially of finely divided materials homogeneously distributed in solutions of organic polymers are applied structure-free to flexible base materials in tape form by means of a knife coater.

17 Claims, 2 Drawing Sheets

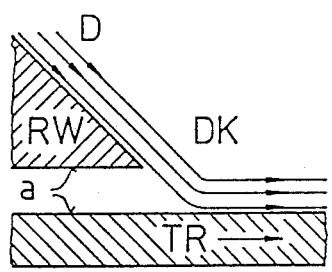
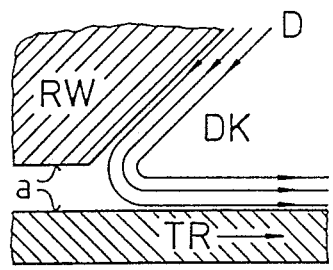
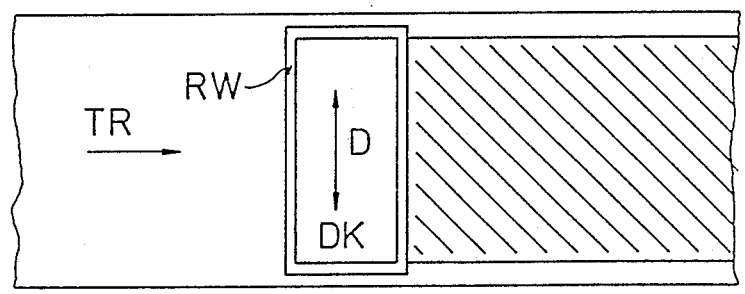
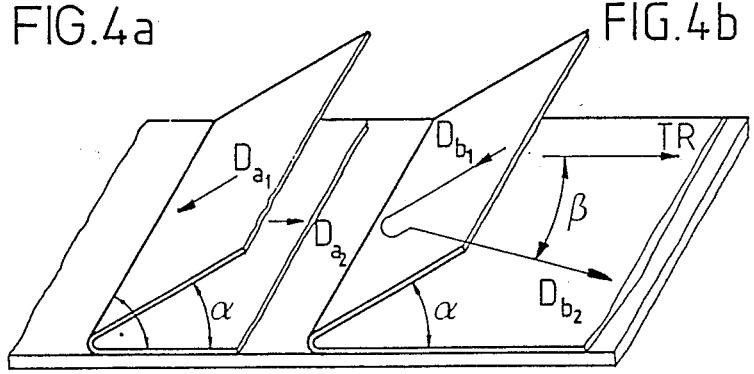

FIG.5
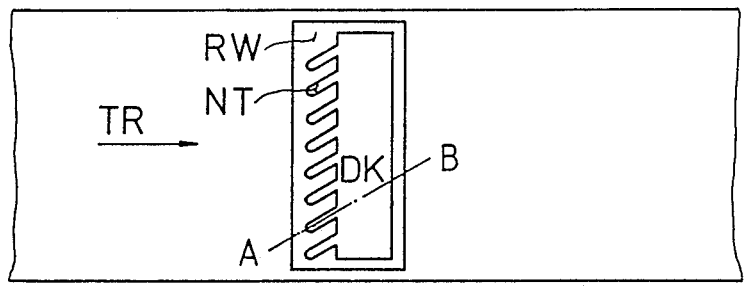
FIG.6 A-B
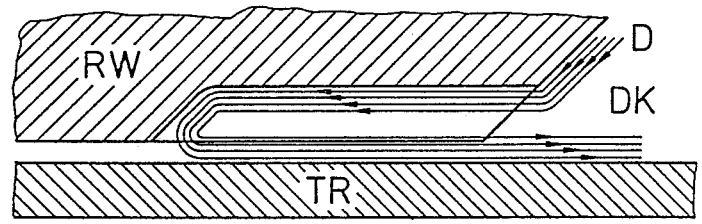
FIG.7
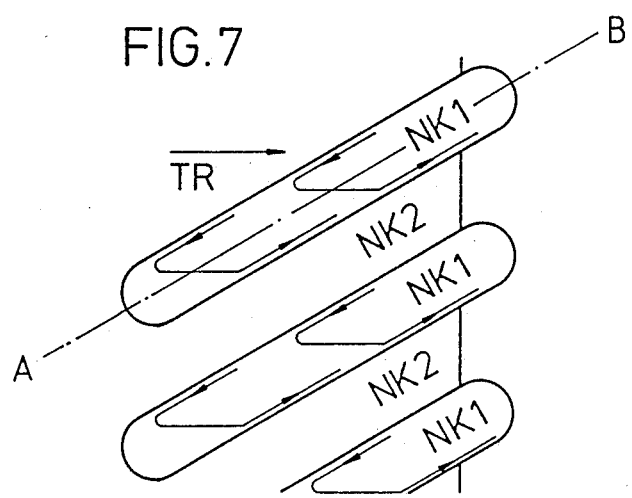

STRUCTURE-FREE APPLICATION OF DISPERSIONS TO FLEXIBLE BASE MATERIALS

The invention relates to a process for the structure-free application of dispersions consistig essentially of finely divided materials homogeneously distributed in solutions of organic polymers to flexible base materials in tape form by means of a knife coater.

In the application of dispersions as used for example in the production of magnetic layers of magnetic recording media to flexible base materials in tape form by means of a knife coater, the rheological properties of the dispersion may lead to a particular, characteristic surface structure being conferred on the resulting layer. It has hitherto not been possible to correlate this structure with any one of the customarily measured rheological parameters, for example flow limit or viscosity. It may well be that only a certain combination of rheological parameters brings about this particular phenomenon in the surface structure, which is also referred to as casting structure. A casting structure is characterized by parallel grooves from 0.1 to 0.5 mm in length which extend in the transport direction of the base tape and are offset against each other. The valleys can be from 50 nm to 500 nm deep, measured from the peak of the crest, and they are from about 30 to 80 $\mu$m in width. Studies have shown that casting structures start to form even in layers below 1 $\mu$m in thickness and become more pronounced with increasing layer thickness. This phenomenon is virtually unaffected by the transport speed of the base material and the effective geometry of the exit slot of the knife coater in relation to the transport direction of the base material. Such casting structures have an adverse effect on the performance of magnetic recording media, in particular the recording of short wavelengths and as regards the signal-to-noise ratio.

It is an object of the present invention to provide a process for the structure-free application of dispersions in the coating of flexible base materials in tape form by means of a knife coater and to develop an apparatus suitable for this purpose.

We have found that this object is achieved in a simple manner when, in the application of the dispersion to the flexible base material in tape form by means of a knife coater, the flow of the dispersion is guided in such a way that the direction of flow at the point where the dispersion transfers to the base material is opposite to the transport direction of the base material. In particular, the flow of the dispersion in the knife-coating unit is guided at least immediately upstream of the transfer of the dispersion to the base material in such a way that at the point of transfer the flow encloses with the transport direction of the base material, relative to the plane thereof, a first angle ($\alpha$) of less than 90°, preferably of from 30° to 70°.

In an advantageous refinement of the process according to the invention, the flow of the dispersion is guided in such a way that at the point of transfer of the dispersion to the base material, the flow encloses in the plane of the base material, relative to the transport direction of the base material, a second angle ($\beta$) of greater than 0°. This process according to the invention is refinable in a particularly convenient manner in such a way that the flow of the dispersion at the first angle ($\alpha$) has superimposed on it a crossflow component at the second angle ($\beta$).

The present invention also provides an apparatus for carrying out this process.

In what follows, the invention is further illustrated by reference to a drawing, in which FIG. 1 shows a dispersion flowing onto a base material TR as in the prior art;

FIG. 2 shows a dispersion D transferring to a base material TR with the direction of flow of the dispersion opposite to the transport direction of the base material;

FIG. 3 shows a plan view of a knife coating unit featuring crossflow of a dispersion D in a dispersion chamber DK;

FIG. 4 shows a schematic representation of the directions of flow of a dispersion D in the course of transfer onto a base material TR in terms of angles $\alpha$ and $\beta$;

FIG. 5 shows a plan view of a knife coating unit featuring grooves NT to produce a crossflow;

FIG. 6 shows the flow of a dispersion D within a groove NT of a knife coating unit as per FIG. 5 along the section AB; and FIG. 7 shows the flow of a dispersion D within a groove NT.

For the purposes of the present invention, dispersions consist essentially of finely divided pulverulent materials, for example $TiO_2$, $SiO_2$, carbon black, magnetic materials, such as iron oxides, metal powders, chromium dioxide, and ferrites, which are incorporated and homogeneously distributed in solutions of organic polymers by means of existing dispersing means with or without dispersants. Suitable solvents, like the specific polymers and base material to which the dispersions are applied, are commonly known and extensively described in the art.

To carry out the process according to the invention, an existing coating knife is redesigned in such a way that the knife backwall RW of the dispersion chamber DK is inclined against the transport direction of the base material TR (FIG. 2). This is contrary to prior art practice (FIG. 1). To ensure that the dispersion D supplied to the dispersion chamber DK assumes a direction of flow which corresponds tot he incline of the knife backwall, it is advantageous for the length of the inclined surface not to be less than 4mm in length. In general, this length will be from 6 to 12 mm. The angle of incline of the knife backwall RW corresponds to the angle $\alpha$ (FIG. 4a) between the knife backwall RW and the surface of the base material TR, this angle $\alpha$ being a target parameter of the process according to the invention which guides the flow direction of the dispersion $Da_1$ toward $Da_1$. This angle is less than 90°, preferably of from 30° to 70°. It is true that a lower value is possible for this angle and indeed leads to the desired object, but having regard to an excessively large casting opening, which would lead to an excessive build-up of pressure underneath the coating kife, this range of angle is customarily not employed for reasons of the mechanical stability of the arrangement.

The process according to the invention is still further refinable by superimposing on the dispersion flow direction, opposite to the transport direction of the base material, a crosswise component. Any crossflow of the dispersion obtainable by moving the knife coating unit (FIG. 3) is not sufficiently strong owing to the limitations of the apparatus and the customary speed of the base material. A sufficiently strong crossflow is obtained for the dispersion by channeling the flow of the dispersion through grooves in the knife backwall, thereby speeding up the flow in the cross-wise direction. To this end, grooves NT (FIG. 5) are cut into a wider than customary knife backwall RW of the dispersion chamber DK at an angle $\beta$ of greater than 0° to the transport direction of the base material, preferably at an angle $\beta$ of from 20° to 50°, so that the dispersion is initially guided toward the base material TR with the flow direction $Db_1$ and then guided further with the flow direction $Db_2$, which contains a crosswise component relative to the transport direction of the base material TR. The width of the grooves is from 1 to 3 mm, and the spacing between the grooves is from 1.5 to 5 mm. Suitable values are easily selectable by means of an experimental setup. For instance, in an experimental setup where the distance a of the underside of the knife backwall from the surface of the base material is 100 $\mu$m, the intergrove spacing of 3 mm was coupled with an individual groove width of 1.5 mm, the depth being 2 mm and the length 12 mm. FIG. 6 depicts a vertical section through one of the grooves NT along the plane A-B in FIG. 5, showing the course of the flow of the dispersion in a coating unit as per FIG. 4b. A horizontal section is shown in FIG. 7. The wetting of a base material with the dispersion introduced at an angle relative to the transport direction of the base material takes place at the groove edge NK1. At the lower opening of the groove the dispersion is speeeded up by the base material Tr in the transport direction and guided against the groove edge NK2, the inclined position of the latter again deflecting the dispersion sidewways. To ensure that the wetting is initiated at the grooves, the grooves must always be kept fully supplied with dispersion. This requires, depending on the viscosity of the dispersion, a positive pressure in the dispersion chamber DK. Typically, from 100 to 300 mbar is sufficient for a customary dispersion viscosity of from 200 to 300 mPa.s. The effectiveness of the grooving in the knife action wall can be additionally enhanced by cutting the grooves not perpendicularly to the coating plane but inclined oppositely to the transport direction, similarly to the knife backwall RW.

Using a knife coater featuring a knife backwall design at the base material inlet side as described, it was possible to apply dispersions of different formulations and rheological data without the direction of coating being discernible in supercritical optical test methods for the study of surface roughness.

We claim:

1. A process for the structure-free application of a dispersion consisting essentially of a finely divided material homogeneously distributed in a solution of an organic polymer to a flexible base material in tape form by means of a knife coater, which comprises, in the application of the dispersion to the base material, guiding the flow of the dispersion in such a way that the direction of flow at the point where the dispersion transfers to the base material is opposite to the transport direction of the base material.

2. A process as claimed in claim 1, wherein the flow of the dispersion is guided in such a way that at the point of transfer of the dispersion to the base material the flow encloses with the transport direction of the base material a first angle ($\alpha$) of from 30° to 70°, relative to the plane of the base material.

3. A process as claimed in claim 1, wherein the flow of the dispersion is guided in such a way that at the point of transfer of the dispersion to the base material the flow encloses in the plane of the base material, relative to the transport direction of the base material, a second angle ($\beta$) greater than 0°.

4. A process as claimed in claim 1, wherein the flow of the dispersion is guided in such a way that at the point of transfer of the dispersion to the base material the flow encloses with the transport direction of the base material, relative to the plane of the base material, a first angle ($\alpha$) of from 30° to 70° and in the plane of the base material, relative to the transport direction of the base material, a second angle ($\beta$) greater than 0°.

5. An apparatus for the structure-free application of a dispersion of finely divided material to a flexible base material, the apparatus comprising:
a dispersion chamber having a knife backwall, the knife backwall being inclined at an angle $\alpha$ which defined by the angle between the knife backwall and the surface of base material, the angle $\alpha$ being less than 90° so that the dispersion will flow along the knife backwall in a direction opposite to a transport direction of the base material.

6. The apparatus of claim 5, wherein the length of the knife backwall is not less than 4 mm.

7. The apparatus of claim 6, wherein the length of the knife backwall is from 6 to 12 mm.

8. The apparatus of claim 5, wherein the angle $\alpha$ is from 30° to 70°.

9. The apparatus of claim 5, further comprising grooves in the knife backwall, the grooves placed in the knife backwall at an angle $\beta$, wherein $\beta$ corresponds to an angle between the transport direction of base material and a direction of dispersion flow after the dispersion is transferred to the base material, and wherein $\beta$ is greater than 0°.

10. The apparatus of claim 9, wherein the grooves have a width from 1 to 3 mm and are spaced from 1.5 to 5 mm apart.

11. The apparatus of claim 9, wherein the angle $\beta$ is at from 20° to 50°.

12. The apparatus of claim 9, wherein the dispersion chamber has a positive pressure.

13. The apparatus of claim 12, wherein the dispersion chamber has a pressure of from 100 to 300 mbar.

14. An apparatus for the structure-free application of a dispersion of finely divided material to a base material, the apparatus comprising:
a dispersion chamber having a knife backwall which guides the flow of the dispersion, wherein the knife backwall:
(a) has a length of not less than 4 mm;
(b) has angular grooves located thereon; and
(c) is inclined at an acute angle from the surface of the base material so that the flow of the dispersion at the point where the dispersion transfers to the base material is opposite to a transport direction of the base material; and,
wherein the dispersion chamber is operated at a positive pressure.

15. The apparatus of claim 14, wherein the length of the knife backwall is from 6-12 mm, and wherein the dispersion chamber has a pressure of 100 to 300 mbar.

16. The apparatus of claim 15, wherein the grooves have a width of from 1 to 2 mm and are spaced 1.5 to 5 mm apart.

17. The apparatus of claim 14, wherein the knife backwall is inclined at an angle of 30°-70°.

* * * * *